Apr. 10, 1923.

J. M. WOLL 1,451,642

AUTOMOBILE HOOD

Filed July 20, 1922

WITNESSES
H. J. Walker
Harrison Ott

INVENTOR
John M. Woll
BY
ATTORNEYS

Patented Apr. 10, 1923.

1,451,642

UNITED STATES PATENT OFFICE.

JOHN MATTHEW WOLL, OF KITTANNING, PENNSYLVANIA.

AUTOMOBILE HOOD.

Application filed July 20, 1922. Serial No. 576,316.

*To all whom it may concern:*

Be it known that I, JOHN M. WOLL, a citizen of the United States, and a resident of Kittanning, in the county of Armstrong and State of Pennsylvania, have invented a new and Improved Automobile Hood, of which the following is a full, clear, and exact description.

This invention has relation to motor vehicles and has particular reference to an improvement in the construction of the hood which houses the engine or motor.

In actual practice it has been observed that the top wall of an automobile hood is subjected to the action of severe heat from the engine and sun combined, and on this account the paint and finish on the same are destroyed long before that of any other part of the car.

As an object the invention contemplates a hood construction for motor vehicles which embodies a double top wall affording an air circulation space therebetween for protecting the paint and finish of the outer wall from the combined action of the heat of the engine and the sun and for assisting in maintaining the air cool around the engine in hot weather and for shielding the same from the cold in cold weather.

As a further object the invention contemplates a means for protecting, sealing and cooling the front of the body immediately under the wind shield by attaching and spacing a protective plate immediately in advance thereof to afford an air circulation space communicating with the air circulation space between the double top wall of the hood.

As a still further object the invention contemplates a hood structure of the character described which is simple in its construction, inexpensive to manufacture and produce, and one which is thoroughly reliable and highly efficient in its purpose.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1:
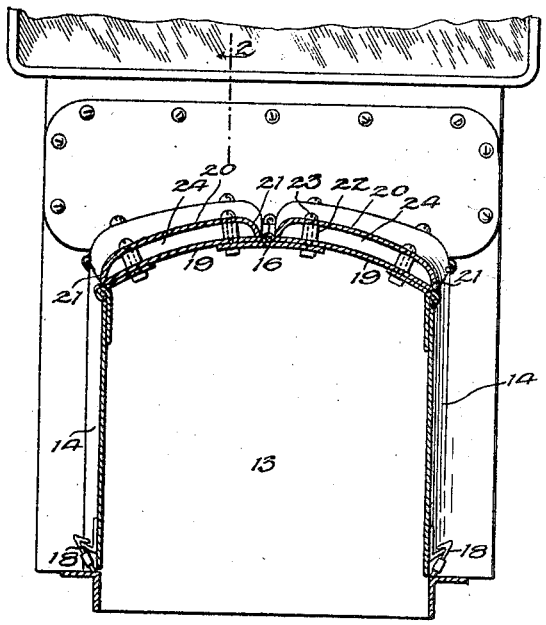
Figure 1 is a transverse sectional view through a hood constructed in accordance with the invention, the same being taken on the line 1—1 of Fig. 2.
Figure 2:
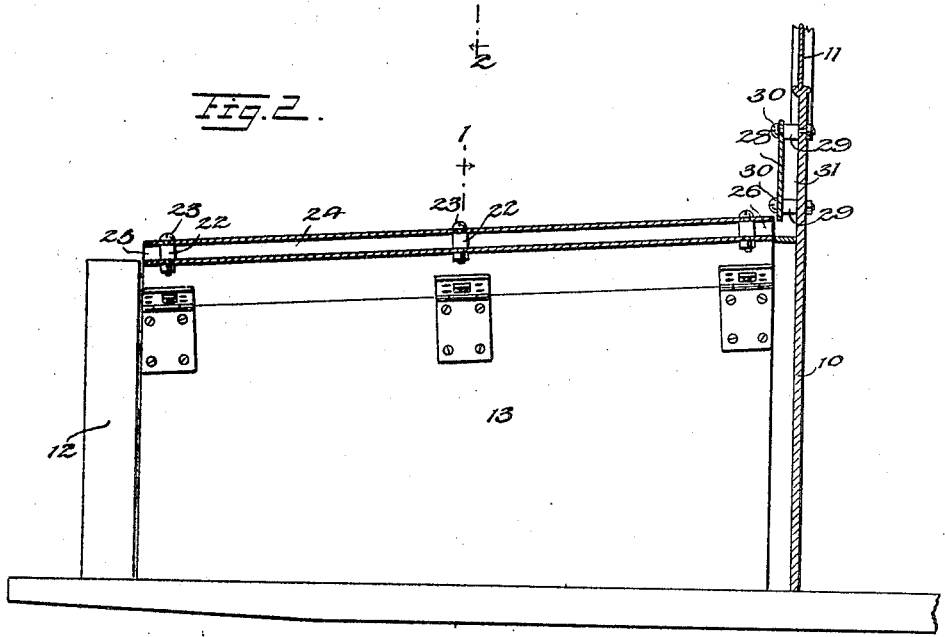
Fig. 2 is a longitudinal sectional view therethrough taken approximately on the line 2—2 of Fig. 1.

Referring to the drawing by characters of reference, 10 designates the front wall of the body of a motor vehicle, 11 the wind shield, 12 the radiator and 13 the hood which houses the motor or engine. The hood which may be of any desired construction is here illustrated as including hingedly connected sides 14 and top sections 15, the latter being hinged together as at 16. The free lower edges of the sides 14 are connected by the latches 18 to the opposite side rails of the chassis frame. The top or deck 16 consists of an inner or lower wall 19 and an outer or upper wall 20 which are spaced apart at their opposite sides by the side walls 21 and at the central portion by spacing sleeves 22 and bolts 23. This provides between the walls an air circulation space 24 which is open at its forward end as at 25 and its rear end as at 26. The forward end of the lower or inner wall is disposed flush with the upper edge of the radiator 12 whereby the air may have free access to the air circulation space 24 through the forward open end 25. In order to protect and cool and at the same time conceal the portion of the front wall 10 of the body which lies between the hood and the wind shield 11, a plate 28 is employed which is attached to the front wall 10 in spaced relation by spacing sleeves 29 and bolts 30. The rear end of the upper or outer wall 20 of the hood deck or top 16 terminates an appropriate distance from the front wall 10 to lie in advance of the lower edge of the plate 28 whereby the air space 31 defined by the plate 28 communicates with the air space 24 of the wall or deck 16 of the hood.

Under this arrangement it will be obvious that the paint and finish of the upper or outer wall 20 will be protected against the heat from the engine by the circulation of air through the air circulation space 24 and at the same time the interior of the hood will be substantially insulated to protect the engine from the heat of the sun or from the cold in the winter time. The plate 28 performs a similar function and co-operates with the air circulation space 24 to protect the paint and finish on the plate 28.

I claim:

1. In combination with an automobile hood construction embodying a double upper wall structure defining an air circulation space and a plate secured to and spaced from the front wall of the automobile body defining an air circulation space which communicates with the air circulation space defined by the double upper wall structure of the hood.

2. In combination, an automobile hood construction embodying an upper wall or deck consisting of spaced inner and outer wall sections defining therebetween an air circulation chamber having open front and rear ends, the open front end of said chamber being disposed above the top of the radiator and the open rear end terminating in advance of the front wall of the automobile body, a plate secured to and spaced from the front wall of the automobile body defining an air circulation chamber having an open lower end communicating with the open rear end of the first mentioned chamber.

JOHN MATTHEW WOLL.